March 19, 1940.  H. C. REEVES  2,193,883
CYCLONE DUST SEPARATOR
Filed Jan. 13, 1939
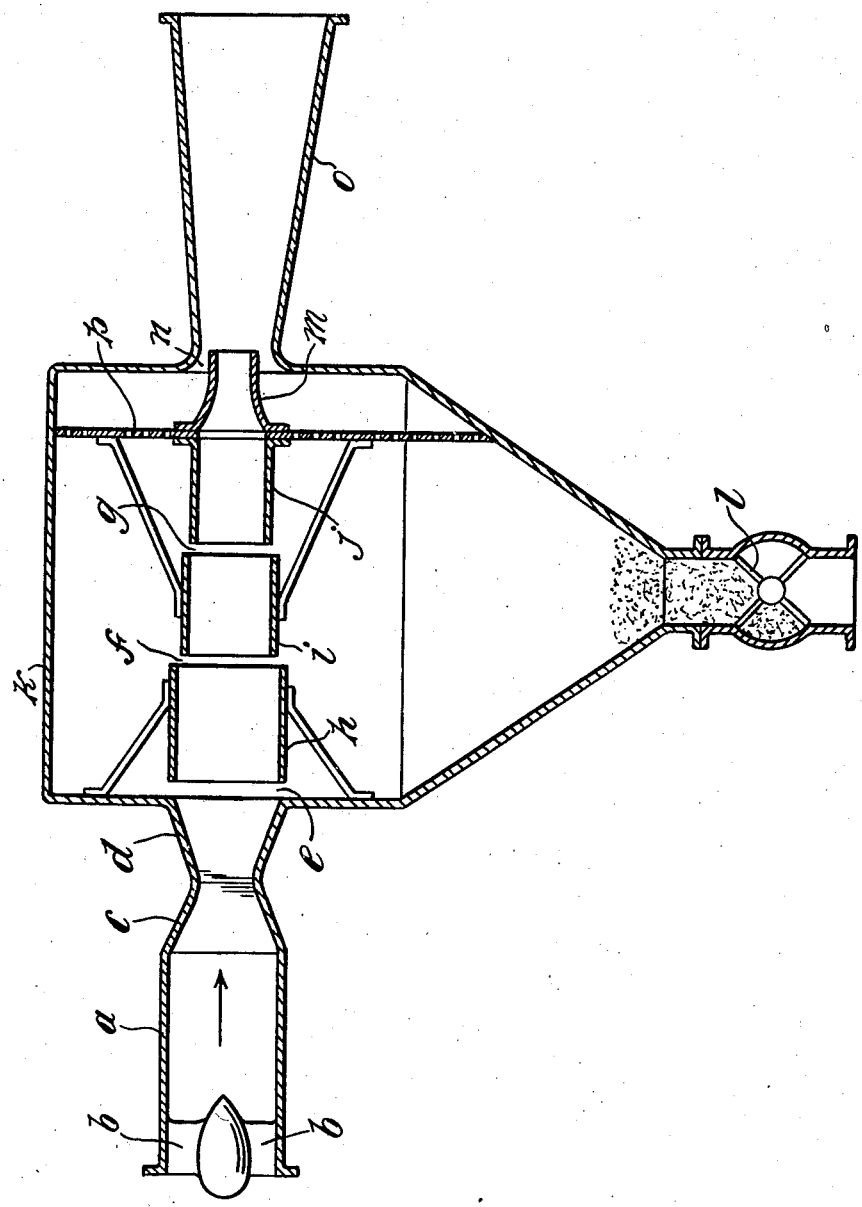
Inventor
HAROLD CHARLES REEVES
BY: Francis E. Boyce
ATTORNEY Patented Mar. 19, 1940

2,193,883

UNITED STATES PATENT OFFICE 2,193,883

CYCLONE DUST SEPARATOR

Harold Charles Reeves, Sheffield, England

Application January 13, 1939, Serial No. 250,692
In Great Britain February 25, 1938

6 Claims. (Cl. 183—80)

This invention relates to dust separators of the straight-through cyclone type wherein dust-laden gas is admitted past inclined guide blades or through a tangential inlet into a chamber, called a cyclone chamber, whereby it is set spinning therein and by the centrifugal action thus engendered concentrates the dust towards the periphery of the cyclone chamber. The concentrated dust is discharged at the periphery of the cyclone chamber, whilst the dust-freed gas passes on straight through the separator.

It has already been proposed in a straight-through cyclone dust separator, to form the cyclone chamber as a Venturi tube, i. e., with a convergent portion connected by a short parallel throat portion to a divergent portion, and to provide an opening, such as an axially extending slot or an annular slot, for the discharge of the dust, in the vicinity of the throat of the Venturi tube.

In the present invention the cyclone chamber of a straight-through dust separator is also formed convergent-divergent but without a dust discharge opening at the throat. According to the present invention, a dust discharge opening located to be encountered by the periphery of the stream of dust-laden gas, is provided beyond the divergent portion of the convergent-divergent cyclone chamber.

The velocity of spin of a vortex is at any radius inversely proportional to such radius, and consequently is greatest at the axis of the vortex.

The convergence of the cyclone chamber concentrates the stream of whirling dust-laden gas towards the axis of the vortex and thus subjects the dust to the greater centrifugal action of the more rapidly spinning gas at the throat of the convergent-divergent chamber, where the entire stream is nearer the axis. This centripetal concentration of the stream of dust-laden gas in conjunction with the greater centrifugal action to which the dust is subjected at the throat, concentrates the dust at the periphery of the constricted stream. On the stream passing along the divergent portion of the chamber, the peripheral portion of the stream wherein the dust is concentrated, enlarges in radius, carrying with it the concentrated dust, and leaving the axial region of the stream comparatively free of dust. The consequent circumferential enlargement of the dust-crowded peripheral portion of the still whirling stream and the centrifugal action, provide space for and cause the dust to approach more closely the actual perimeter of the stream, so that on the periphery of the stream encountering an annular opening a large proportion of the dust can escape therethrough or be skimmed off with a comparatively thin peripheral zone of the stream of gas.

The divergent portion of the chamber also acts as a diffuser to convert into pressure the axial velocity of the gas acquired in the convergent portion.

The annular outlet is of a diameter to be encountered by the peripheral portion of the stream as it emerges from the diffuser. The stream may encounter a series of axially separated coaxial annular outlets successively smaller in diameter, the stream passing along axially extending parallel walled tubular passages successively smaller in diameter between each outlet.

The outlet or outlets may open into a surrounding closed dust-collecting chamber, for instance having a hopper bottom closed by a dust discharge valve.

In order to induce a reduced pressure in the surrounding dust-collecting chamber and thereby promote the entrance thereinto of dust-laden gas, a convergent nozzle may be provided through which the onflowing stream of gas passes and issues at increased velocity axially past a surrounding annular outlet from the dust-collecting chamber. This will exert an ejector suction action on the dust-collecting chamber thus reducing the pressure therein.

Between the last inlet and the outlet, the dust-collecting chamber is divided by a filter partition to prevent dust being drawn out of this chamber. The ejector nozzle and some of the short lengths of tubing providing the successive axial passages, may be supported by the filter partition, whereby the latter will become rattled and shake off dust, by the vibration set up by the onflowing gas due to imperfections in configuration. The filter partition may itself be flexibly mounted to facilitate vibration.

The whirl may be taken out of the stream of gas by fixed guide blades or a volute casing on or after leaving the cyclone dust separator.

A plurality of straight-through dust separators may, in the known manner, be provided in a dust-collecting hopper chamber common to all.

The convergent-divergent portion of the cyclone chamber may be designed as a true Venturi tube to reconvert into pressure the acquired velocity with a minimum loss, but this is not essential.

A representative example of a dust separator according to the invention is illustrated, somewhat diagrammatically, in vertical section on the accompanying drawing, in which:

*a* is a tubular cyclone chamber into which dust-laden gas is delivered past guide blades *b*, which impart a whirl to the entering gas.

The tubular cyclone chamber *a* has a convergent portion *c* followed by a divergent portion *d*. In traversing the convergent portion *c* the axial velocity of the stream of gas will increase whilst, incidentally, its pressure decreases. In traversing the divergent portion *d*, the axial velocity will diminish accompanied by a consequent increase of pressure, to approximately the pressure at the inlet to the convergent portion *c* if the diameters of inlet and outlet are approximately the same. There will therefore be no substantial loss of energy by the stream of gas traversing the convergent-divergent passage.

In traversing the convergent portion *c*, the stream of dust-laden gas will also become constricted, so that all the dust becomes subjected to the higher angular velocities of whirl which are present in the region of the axis of the stream and the vortex formed therein. The dust will, by the centripetal contraction of the stream and by the greater centrifugal force to which the dust is subjected nearer the axis, become concentrated at the peripheral portion of the stream. On the stream traversing the divergent portion *d*, the dust-crowded peripheral portion of the stream will enlarge in diameter and, owing to the consequent increase in length of its circumference, this peripheral zone of dust, still of course subjected to centrifugal action due to the whirl, will become thinner. The crowd of dust will thus become located closer to the actual periphery of the stream, and therefore more available to be skimmed off from the main stream. This is effected by a series of annular openings, *e*, *f*, *g* coaxial with and beyond the convergent-divergent portion *c d* of the cyclone chamber, and of progressively smaller diameter decreasing from the diameter of the outlet end of the divergent portion *d* of the cyclone chamber.

The annular openings *e*, *f*, *g* are provided by gaps between the adjacent ends of parallel walled tubes *h*, *i*, *j*, of successively smaller diameters arranged coaxial with and in extension of the cyclone chamber *a*, *c d*.

The tubes *h*, *i*, *j* extend through a closed dust-collecting chamber *k* into which the dust-laden gas, skimmed-off the stream, passes through the annular openings *e*, *f*, *g*.

The bottom of the closed chamber *k* is formed as a hopper at the bottom of which is an outlet closed by a dust-discharging valve *l*.

A convergent nozzle *m* is connected on to the end of the final tube *j* wherefrom the stream of gas issues with an increased velocity. The end of this nozzle *m* extends with a clearance through an aperture in the wall of the dust-collecting chamber *k*, leaving an annular gap *n*. The gas issuing from the nozzle *m* thereby exerts an ejector action on the gas in the dust-collecting chamber *k*, thus withdrawing gas therefrom through the gap *n* reducing the pressure in the chamber *k* and promoting the entry of dust-laden gas through the annular openings *e*, *f*, *g*.

From the nozzle *m* and the dust-collecting chamber *k* the recombined stream of gas passes on through an outlet tube *o* which is divergent to act as a diffuser and convert into pressure the velocity of the gas.

The whirl may also be taken from the gas and the energy thereof recovered as pressure, by suitable delivery guide blades in or after the diffuser *o*.

Between the last annular dust inlet *g* into the dust-collecting chamber *k* and the gas outlet *n* therefrom, the dust-collecting chamber *k* is divided by a perforated filter partition *p*. This may be covered by a filter cloth or the perforations thereof may be sufficiently fine to intercept dust from being drawn out through the gap *n*. In order that this filter partition *p* may be subject to vibration to shake off dust, the last two tubes *i*, *j* and the nozzle *m* are supported on the filter partition *p*, and the latter may be flexibly mounted. Thus the vibrations to which, owing to unavoidable imperfections of structure, the tubes *i*, *j* and nozzle *m* will be subjected by the stream of gas in passing therethrough, will be communicated to the filter partition *p*.

The dust discharge openings need not necessarily be annular, as a lip on an axially extending slot can skim the dust from the rotating gas stream.

I claim:

1. In a straight-through cyclone dust separator, a cyclone chamber, means for admitting gas to and causing said gas to spin in a vortex in said cyclone chamber, a convergent-divergent axial portion of said cyclone chamber, a coaxial series of separated tubes of progressively smaller diameter separated and extending axially from the divergent portion of said cyclone chamber, and a dust-collecting chamber surrounding said tubes.

2. In a straight-through cyclone dust separator, a cyclone chamber, means for admitting gas to and causing said gas to spin in a vortex in said cyclone chamber, a convergent-divergent axial portion of said cyclone chamber, a coaxial series of separated tubes of progressively smaller diameter separated and extending axially from the divergent portion of said cyclone chamber, a closed dust-collecting chamber surrounding said tubes and having an outlet axially aligned with said tubes and remote from said cyclone chamber, a filter within said dust-collecting chamber and in front of said outlet, and an ejector nozzle extending coaxially from the terminal tube of said series of tubes through said outlet from said dust-collecting chamber.

3. In a straight-through cyclone dust separator, a cyclone chamber, means for admitting gas to and causing said gas to spin in a vortex in said cyclone chamber, a convergent-divergent axial portion of said cyclone chamber, a coaxial series of separated tubes of progressively smaller diameter separated and extending axially from the divergent portion of said cyclone chamber, a closed dust-collecting chamber surrounding said tubes and having an outlet axially aligned with said tubes and remote from said cyclone chamber, a filter partition within said dust-collecting chamber and in front of said outlet and transverse to said tubes, and an ejector nozzle supported solely by said partition and extending coaxially from the terminal tube of said series of tubes through said outlet from said dust-collecting chamber.

4. In a straight-through cyclone dust separator, a cyclone chamber, means for admitting gas to and causing said gas to spin in a vortex in said cyclone chamber, a convergent-divergent axial portion of said cyclone chamber, means for skimming-off a thin peripheral zone of the spinning gas located beyond the divergent portion of said cyclone chamber, a closed dust-collecting chamber surrounding said skimming means and receiving said skimmed-off gas and having an outlet axially aligned with said convergent-divergent portion of said cyclone chamber, and an ejector nozzle axially aligned with said convergent-divergent portion of said cyclone chamber and extending through said outlet from said dust-collecting chamber.

5. In a straight-through cyclone dust separator, a cyclone chamber, means for admitting gas to and causing said gas to spin in a vortex in said cyclone chamber, a convergent-divergent axial portion of said cyclone chamber, annular means for skimming-off a thin peripheral zone of the spinning gas located beyond the divergent portion of said cyclone chamber, a closed dust-collecting chamber surrounding said skimming means and receiving said skimmed-off gas and having an outlet axially aligned with said convergent-divergent portion of said cyclone chamber, and an ejector nozzle axially aligned with said convergent-divergent portion of said cyclone chamber and extending through said outlet from said dust-collecting chamber.

6. In a straight-through cyclone dust separator, a cyclone chamber, means for admitting gas to and causing said gas to spin in a vortex in said cyclone chamber, a convergent-divergent axial portion of said cyclone chamber, means for skimming-off a thin peripheral zone of said spinning gas located adjacent the divergent portion of said cyclone chamber, a closed dust-collecting chamber receiving said skimmed-off gas, and an ejector nozzle axially aligned with said convergent-divergent portion of said cyclone chamber and withdrawing gas from said dust-collecting chamber.

HAROLD CHARLES REEVES.